Figure 1:
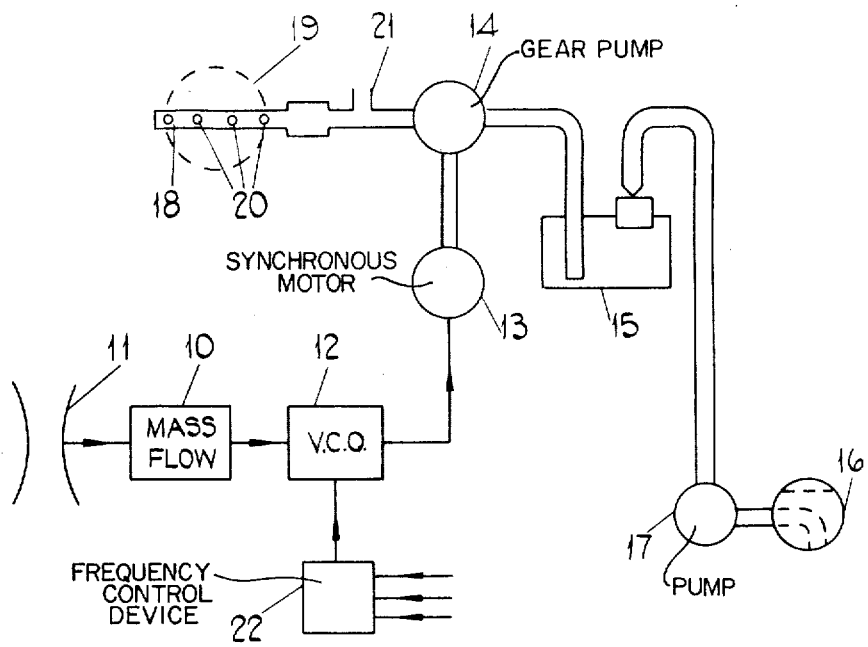

United States Patent
Wentworth et al.

[11] 3,913,547
[45] Oct. 21, 1975

[54] FUEL CONTROL SYSTEMS

[75] Inventors: Philip Rossell Wentworth, Birmingham; John Anthony Jeyes, Solihull, both of England

[73] Assignee: The Lucas Electrical Company Ltd., Birmingham, England

[22] Filed: Feb. 19, 1974

[21] Appl. No.: 443,842

[30] Foreign Application Priority Data
Feb. 20, 1973 United Kingdom............... 8216/73

[52] U.S. Cl. ... 123/139 E; 123/139 R; 123/139 AW
[51] Int. Cl.² .......................................... F02M 51/00
[58] Field of Search..... 123/139 E, 139 R, 139 AW; 417/42

[56] References Cited
UNITED STATES PATENTS

| | | | |
|---|---|---|---|
| 3,106,196 | 10/1963 | Woodward et al. | 123/139 AW |
| 3,236,221 | 2/1966 | Lear | 123/139 E |
| 3,669,081 | 6/1972 | Monpetit | 123/139 R |

*Primary Examiner*—Charles J. Myhre
*Assistant Examiner*—Joseph Cangelosi
*Attorney, Agent, or Firm*—Waters, Schwartz & Nissen

[57] ABSTRACT

An engine fuel control system including a mass flow measuring device which measures the mass flow of air to the engine and a pump which is driven by a motor at a speed dependent on the electrical output of the measuring device. The pump delivers fuel to nozzles in the engine air inlet manifold downstream of the throttle valve.

7 Claims, 2 Drawing Figures

FUEL CONTROL SYSTEMS

This invention relates to engine fuel control systems for vehicles, and more particularly road vehicles, and has as its object the provision of such a system in a convenient form.

According to the invention, an engine fuel control system comprises a mass flow measuring device for producing a continuous electrical signal representative of the mass flow of air in the induction manifold of the vehicle engine, a pump for feeding fuel to the engine at a rate dependent upon the speed of operation of the pump, and a motor for continuously driving the pump, the speed of the motor being variable in accordance with said electrical signal.

Figure 2:
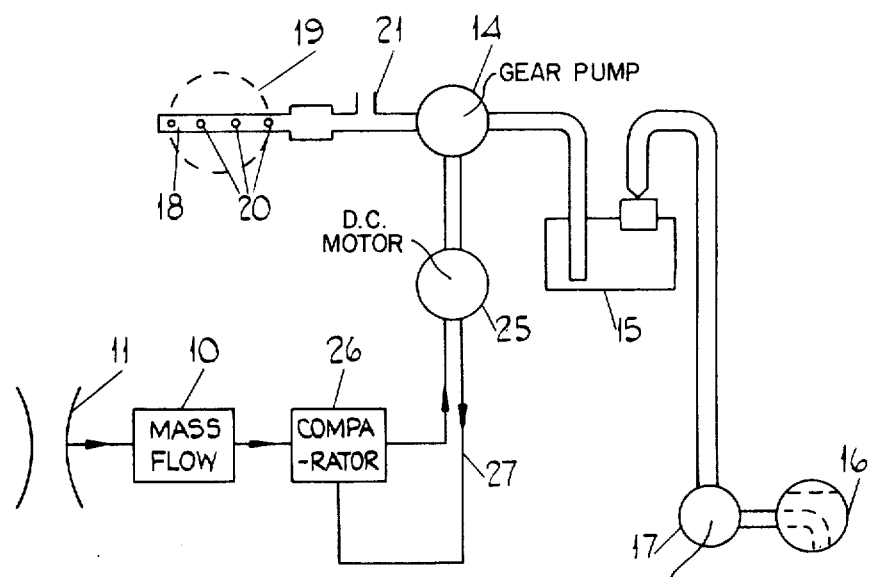

In the drawings:

FIG. 1 is a diagrammatic view of one embodiment of a fuel control system constructed in accordance with the present invention, and FIG. 2 is a diagrammatic view of a further embodiment of a fuel control system constructed in accordance with the present invention.

Referring to FIG. 1 of the drawings, the fuel control system shown therein comprises a mass flow measuring device 10 which produces an electrical output directly proportional to the mass flow of air in the induction manifold 11 of an internal combustion engine. The mass flow measuring device 10 includes an ion producer (not shown) which is mounted in the inlet manifold 11, and one or more electrodes (not shown) which are also mounted in the inlet manifold 11 opposite the ion producer so that the current measured at the electrode or electrodes will give the aforesaid electrical output of the mass flow measuring device. The output of the mass flow measuring device is used to control the output frequency of a voltage controlled oscillator 12. The output frequency of the voltage controlled oscillator 12 varies in accordance with the mass flow of air in the induction manifold 11 and this output is used to drive a synchronous motor 13, the rotor speed of which is dependent upon the output frequency of the voltage controlled oscillator 12.

The fuel control system also includes a gear pump 14, that is to say a pump having a pair of meshing gear wheels mounted in a casing, one of said gear wheels being drivable, rotation of said one gear wheel also effecting rotation of the other gear wheel so that fuel is carried round between an inlet and an outlet in pockets formed between the gear teeth and the casing. The aforesaid drivable gear wheel of the gear pump 14 is connected to the rotor of the synchronous motor 13. The gear pump 14 draws fuel from a floatchamber 15 which in turn is supplied with fuel from a fuel tank 16 by a conventional fuel pump 17.

The gear pump 14 is arranged to continuously feed fuel drawn from the floatchamber 15 into a hollow angularly movable spindle 18 which forms part of a "butterfly" throttle valve 19 located in the inlet manifold of the internal combustion engine. The spindle 18 is provided with a plurality of apertures 20 which extend through the spindle 18 in a direction perpendicular to the axis of the spindle and also perpendicular or substantially perpendicular to the plane of the butterfly valve 19, and which communicate with the bore of the spindle. The apertures 20 thus form multiple jet orifices through which fuel can be discharged into a main air stream and then mixed with this air stream in a finely atomized form. A vent 21 may be provided intermediate the gear pump 14 and the butterfly valve 19. This vent 21 at least reduces the tendency for fuel to be sucked straight through the gear pump 14 when the pressure in the inlet manifold is below that of the atmosphere.

The gear pump 14 when driven by the synchronous motor 13 meters fuel between the floatchamber 15 and the apertures 20, and the rate of flow of fuel through the gear pump 14 is dependent upon the speed of operation of the gear pump and thus upon the supply frequency of the stator windings of the synchronous motor 13. Thus, fuel is supplied to the inlet manifold at a rate dependent upon the mass flow of air in the inlet manifold.

As aforesaid, the butterfly throttle valve 19 is angularly movable and thus a form of rotary seal (not shown) is required between the stationary fuel feed pipe from the gear pump 14 and the hollow angularly movable spindle 18.

Cold start enrichment and variation in air/fuel ratio required for correct operation at different temperatures during warm up, and fuel enrichment for maximum power at full throttle may be incorporated by a variation of the output frequency of the voltage controlled oscillator by a control device indicated at 22.

Referring now to FIG. 2 of the drawing, the fuel control system shown therein is similar to that shown in FIG. 1 of the drawing, but the synchronous motor 13 is replaced by a d.c. motor 25 and the voltage controlled oscillator 12 is replaced by a comparator 26. The comparator 26 compares the output signal of the mass flow measuring device 10 with a signal representative of the speed of the d.c. motor 25 which latter signal passes over a line 27 and must be compatible with the signal fed to the comparator from the mass flow measuring device 10. Thus, in use, the comparator 26 will compare the two signals and thence furnish an error signal to control the speed of the d.c. motor 25.

What is claimed is:

1. In a fuel control system for an engine of a vehicle having an induction manifold, the improvement comprising a mass flow measuring device for producing a continuous electrical signal representative of the mass flow of air in the induction manifold of a vehicle engine, a pump for feeding fuel to the engine at a rate dependent upon the speed of operation of the pump, a motor for continuously driving the pump, the speed of the motor being variable in accordance with said electrical signal, said motor being a synchronous a.c. motor, and a variable frequency oscillator connected to said mass flow measuring device and to said motor to drive the latter, said oscillator having a frequency which is determined by said continuous electrical signal.

2. An engine fuel control system as claimed in claim 1 further comprising a device for independently varying the frequency of said variable frequency oscillator in accordance with at least one additional engine operating parameter.

3. An engine fuel control system as claimed in claim 1 in which said pump is a gear pump.

4. An engine fuel control system as claimed in claim 1 in which the induction manifold of the engine has a butterfly-type throttle valve therein having a hollow spindle formed with apertures perpendicular to the general plane of the butterfly valve, said hollow spindle being connected to the pump so that fuel is discharged in use into the induction manifold through said apertures.

5. In a fuel control system for an engine of a vehicle having an induction manifold, the improvement comprising a mass flow measuring device for producing a continuous electrical signal representative of the mass flow of air in the induction manifold of a vehicle engine, a pump for feeding fuel to the engine at a rate dependent upon the speed of operation of the pump, a motor for continuously driving the pump, the speed of the motor being variable in accordance with said electrical signal, said motor being a d.c. motor, and a comparator connected to said mass flow measuring device and to said motor such that said continuous electrical signal is supplied to the comparator which controls the speed of the motor in response thereto.

6. An engine fuel control system as claimed in claim 5 in which said pump is a gear pump.

7. An engine fuel control system as claimed in claim 5 in which the induction manifold of the engine has a butterfly-type throttle valve therein having a hollow spindle formed with apertures perpendicular to the general plane of the butterfly valve, said hollow spindle being connected to the pump so that fuel is discharged in use into the induction manifold through said apertures.

* * * * *